United States Patent [19]

Eckhardt

[11] 4,175,475
[45] Nov. 27, 1979

[54] WORM THREAD SEAL FOR STEERING GEAR

[75] Inventor: Dennis C. Eckhardt, Saginaw, Mich.

[73] Assignee: General Motors Corporation, Detroit, Mich.

[21] Appl. No.: 855,883

[22] Filed: Nov. 30, 1977

[51] Int. Cl.² ............................ F01B 3/08; F16J 15/40
[52] U.S. Cl. .................................. 92/33; 74/424.8 R;
        92/136; 92/185; 277/27; 277/203
[58] Field of Search .................... 92/33, 136, 185;
        277/203, 204, 27; 74/424.8 R

[56] References Cited

U.S. PATENT DOCUMENTS

| | | | |
|---|---|---|---|
| 1,612,038 | 12/1926 | Miller | 92/185 X |
| 3,116,931 | 1/1964 | Edwards | 277/165 |
| 3,443,814 | 5/1969 | Dahlheimer | 277/27 |
| 3,579,984 | 5/1971 | Rohde | 60/384 |
| 3,727,925 | 4/1973 | Jones | 92/185 X |

*Primary Examiner*—Irwin C. Cohen
*Attorney, Agent, or Firm*—Charles R. White

[57] ABSTRACT

Worm to rack piston seal for power steering gear having a resilient cylindrical body with internal thread construction conforming to the profile and lead of the worm for a rack piston nut. During powered right and left turns, the seal is pressure loaded radially for improved fluid sealing and relaxed during low pressure conditions when there is no steering input for improved returnability of the rack piston nut to its centered position.

3 Claims, 3 Drawing Figures

WORM THREAD SEAL FOR STEERING GEAR

This invention relates to fluid sealing and more particularly to a new and improved worm thread seal for a rack piston nut of a power steering gear.

Prior to the present invention many power steering gear designs having worm and piston nut construction, incorporated a fluid sealing cap or stopper at the end of the piston nut to prevent fluid leakage between the pressure chambers formed by the piston nut and the piston-nut bore in the steering gear housing. With the pressure chambers established, fluid pressure differentials controlled by a rotary valve in the gear were selectively utilized for power steering. While such piston-nut stopper constructions provided for good sealing and power steering, their employment generally resulted in comparatively large gears which are often not suitable for use in crowded spaces such as in the engine compartments of compact-type vehicles. To reduce the size of power gears, other designs eliminated the piston nut stopper or cap by employing a worm thread seal operatively disposed between the worm and the piston nut so that the worm could extend completely through the nut and while still providing for the establishment of the pressure chambers on either side of the piston nut. While prior worm thread seals have provided improved benefits and particularly permitted the steering gear unit to be made shorter, high friction on return to center for straight ahead steering and leakage across the piston nut detracted from steering gear performance.

With these prior constructions in mind, it is a feature, object and advantage of this invention to provide a new and improved worm thread seal for the worm and piston nut construction of a power steering gear which incorporates a cylindrical sealing construction disposed in threaded relationship with the worm and secured within the piston nut. This new and improved seal communicates with the pressure chambers of the unit on left or right turns to conform to the configuration of the worm and which takes advantage of fluid pressures within the unit to squeeze on the worm to provide improved fluid sealing of the pressure chambers provided by the piston nut. For subsequent straight ahead steering, the seal relaxes so that friction forces are reduced and the gear readily returns to a centered, straight ahead steering condition.

These and other features, objects and advantages of this invention will become more apparent from the following detailed description and drawing in which.

Figure 1:
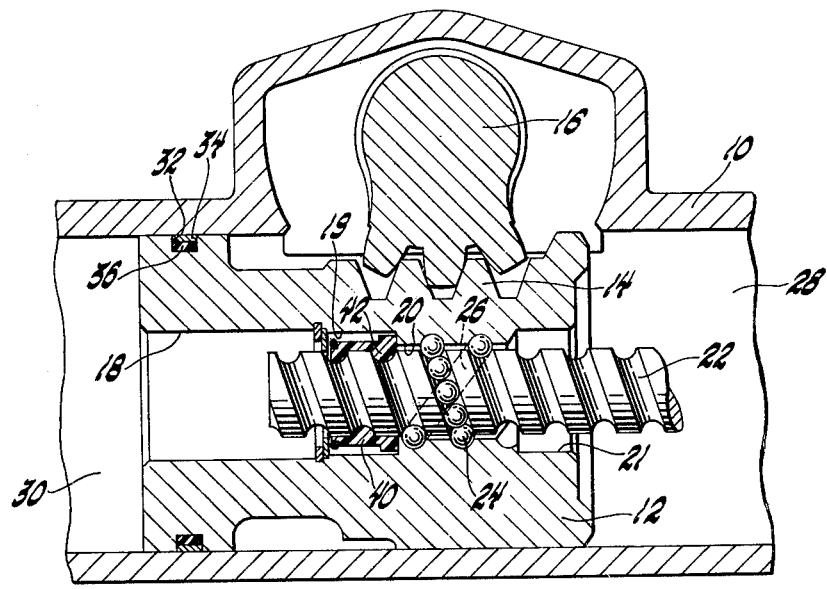
FIG. 1 is a fragmentary longitudinal section of a portion of a power steering gear incorporating the seal construction of this invention.

Referring now to FIG. 1 in detail, the numeral 10 denotes a power cylinder of a power steering gear confining a piston nut 12 having rack teeth 14. These teeth engage with the teeth of a swingable gear sector 16 which may be assumed as integral with a cross shaft carrying a pitman arm, not shown, through which the steering linkage of the vehicle is articulated.

Piston nut 12 has a worm passage extending therethrough comprising a first large diameter portion 18 extending from one end of the piston, an intermediate diameter portion 19 and small diameter portion 20 which leads into a second large diameter portion 21. The small diameter portion of the passage, into which an elongated worm 22 extends, is provided with a helical groove coacting with the groove of the worm 22 to provide a race for a train of balls 24 which, in operation of the steering gear, move in a path made endless by a transfer or return tube indicated at 26.

Piston 12 is slidably mounted in the power cylinder 10 and cooperates therewith to form working chambers 28 and 30 in which fluid pressure is fed and exhausted by the control valve component of the steering gear, not shown. The power cylinder, pressure chambers and control valve are preferably similar to those described in U.S. Pat. No. 3,579,984 to Robert P. Rohde, et al hereby incorporated by reference. As will be appreciated by those skilled in the art, on a powered left turn a pressure differential is created across the piston nut in favor of chamber 28 while on a powered right turn the pressure differential is in favor of chamber 30. A detailed description of such power steering is set forth in the above referenced patent to Rohde, et al. Mechanical steering is achieved by mechanical turning input into worm 22 through a lost motion mechanism, not illustrated, to effect translation of piston nut 12 resulting in the turning of gear sector 16.

A composite seal, located in an annular groove 32 and comprising an outer ring or band 34 and an inner O-ring component 36, is sealing engaged with the internal wall of the power cylinder 10 to effectively prevent leakage between chambers 28 and 30 about a periphery of piston 12.

Leakage between the chambers 28 and 30 through the central worm passage of the piston is effectively eliminated by the special seal construction to which this invention is drawn. This seal construction includes a cylindrical body or sleeve 40 immediately surrounding the worm 22. As shown, the sleeve has integral helical land or thread 42, the conformation and lead of which matches that of worm 22. The sleeve element 40 is preferably formed of a glass filled nylon or other suitable material which has good wear characteristics and can be squeezed or deflected by the high fluid pressures within the power cylinder to provide for improved fluid sealing. The sleeve element 40 additionally has an integral annular flange 46 formed at one end thereof. The sleeve element 40 is adapted to be displaced axially within the intermediate diameter portion of the bore so that flange 46 sealingly engages the radially extending wall 50 forming the step between the intermediate and small diameter portions of the central passage of the piston nut.

Sleeve 40 is trapped in the intermediate diameter portion 19 of the central passage by an annular backup washer 54 that fits against the shoulder 55 forming the radial end wall of the intermediate diameter portion of the worm passage. A snap ring 56 mounted in an annular groove 58 formed in the worm passage immediately outboard of the washer 54 holds the backup washer against the shoulder 55. The washer 54 is axially spaced from the radial wall 50 by an amount which is slightly greater than the length of the sleeve 40. This spatial difference may, under certain conditions, result in clearance shown at 59 in FIG. 2 and provides a passage between chamber 30 and intermediate chamber 60. Chamber 60 is pressurized on right and left turn power steering and relieved for return to straight ahead steering as will be further explained below.

Figure 2:
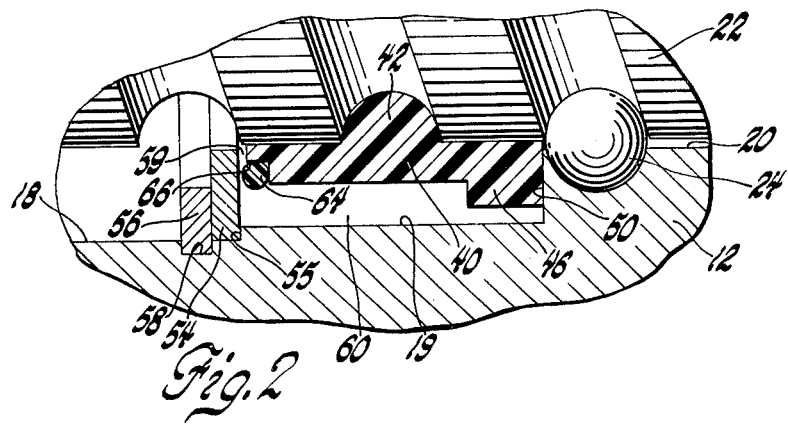
FIG. 2 is an enlargement of a portion of the view of FIG. 1 illustrating the seal construction of this invention.

In the construction of FIGS. 1 and 2, there is an O-ring seal 64 disposed around the step end 66 of the sleeve 40 to provide for improved fluid sealing between the sleeve and backup washer under certain operating conditions. On left turn power steering, when left turn chamber 28 is pressurized and right turn chamber 30 is opened to sump by the power steering valve, the sleeve 40 will be axially displaced by threading along the worm in response to high fluid pressure in the chamber 28 so that O-ring 64 sealing engages the backup washer 54. When chamber 28 is charged with steering pressure, clearance appears between the flange 46 of the sleeve and radial wall 50. Under these conditions, clearance 59 closes as the O-ring 64 sealingly engages washer 54 to prevent the passage of pressure fluid between the chambers. Furthermore, when chamber 60 is pressurized a radial constricting force squeezes the sleeve inwardly so that it closely conforms to the configuration of the worm to provide for improved piston nut to worm fluid sealing. With pressure differentials established, the piston nut axially moves in power cylinder 10 to turn gear sector 16 and thereby power steer the vehicle as is well known in this art.

When steering input is terminated the pressure in chambers 28 and 30 are reduced and equalized. When this occurs, the pressure in chamber 60 is accordingly reduced and the gripping of the sleeve on the worm is relaxed. Under these conditions, the geometry of the wheel suspension of the vehicle readily returns the dirigible wheels of the vehicle and the piston nut of the power steering gear to a centralized straight ahead steering position. With the relaxed state of the sleeve, frictional forces between the sleeve and worm are reduced to an extent so that no appreciable drag load is added to the gear to inhibit the returnability of the wheels and steering components to their straight ahead positions. Right turn power steering is best illustrated in FIG. 2 with flange 46 sealingly engaging radial wall 50 and with chamber 60 open to the high pressure right turn chamber 30. The squeezing action is the same as described in connection with right turn steering.

Figure 3:
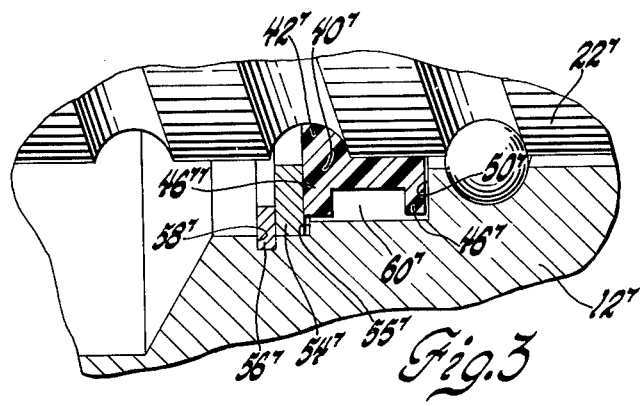
FIG. 3 is a view similar to FIG. 2 showing an alternate embodiment of the invention.

The construction of FIG. 3 is similar to the construction of FIGS. 1 and 2 and corresponding components are identified with the same reference numerals which have been primed in connection with this embodiment. As in the embodiment of FIGS. 1 and 2, the piston nut 12' is slidably mounted in a power cylinder of a power steering gear and has a central worm passage extending therethrough which accommodates an elongated worm 22'. To provide for improved worm piston nut fluid sealing, this embodiment of the invention also incorporates a glass filled cylindrical body or sleeve 40' having an integral helical thread 42' which conforms to the lead of the worm 22'. In addition to the helical thread 42', this embodiment of the invention is formed with integral flanges 46' and 46" at either end of the sleeve. The flange 46' is adapted to engage the radial wall 50' of the piston nut 12' when right turn chamber 30 is pressure charged for right turn power steering. When the left turn chamber is pressure charged, the sleeve 40' is threaded to the left by the pressure differential and flange 46" is moved into sealing engagement with the backup washer 54' mounted in the worm passage against shoulder 55' by a snap ring 56' located in an annular groove 58'.

As in the previous construction, the axial distance between washer 54' and the radial wall 50' is slightly greater than the length of the sleeve 40'. This provides a slight clearance to permit seal chamber 60' to be pressurized on left and right turn power steering.

When chamber 60' is pressurized, the radial forces on sleeve 40' cause it to constrict or squeeze tightly against the profile of the worm for improved fluid sealing. With the sleeve 40' constricted against the worm, and with flange 46' in engagement with radial wall 50' or with flange 46" in engagement with the backup washer 54', the pressure differential across piston 12' is effective to axially displace the piston. This action accordingly turns gear sector 16' for steering the dirigible wheels of the vehicle. As in the embodiment of FIGS. 1 and 2, chamber 60' is open to sump when the gear is conditioned for straight ahead steering so the drag load of the sleeve 40' is minimized.

While a preferred construction of this invention has been shown and described to illustrate the invention, others will become more apparent to those skilled in the art. Accordingly, the scope of this invention is set forth by the following claims.

I claim:

1. A vehicle power steering gear comprising a housing, a piston nut slidably mounted in said housing and separating said housing into a pair of primary fluid pressure chambers, said nut having an axially extending bore formed therein, a cylindrical worm extending through said bore into said nut, said worm having a helical thread, thread engaging means carried by said nut and operatively engaged with said thread of said worm so that rotation of said worm will axially slide said nut in said housing, a seal assembly for restricting the fluid passage between said chambers through said helical thread of said worm, said seal assembly comprising a resilient body terminating in radially extending sealing surface means, said bore being enlarged to form a cavity for said seal assembly and to provide a radial contact wall for said sealing surface means thereof, said resilient body having internal thread means for engaging the helical thread of said worm, backing means laterally spaced from said contact wall and carried by said nut for trapping said resilient body in said cavity, said seal assembly cooperating with said radial contact wall and said backing means for forming an auxiliary pressure chamber between said nut and said resilient body, said auxiliary pressure chamber being concentrically outwardly of said resilient body so that when one of said primary fluid pressure chambers is pressurized said sealing surface means axially and sealingly engages said radial wall and said seal body is constricted by pressure fluid fed from said one of said chambers into said auxiliary pressure chamber radially inwardly against said worm to effect radial sealing therewith to thereby prevent fluid communication between said primary fluid pressure chambers through the thread of said worm.

2. A vehicle power steering gear comprising a housing, a piston nut slidably mounted in said housing and separating said housing into a pair of primary fluid pressure chambers, said nut having an axially extending bore formed therein, a cylindrical worm extending through said bore into said nut, said worm having a helical thread, thread engaging means carried by said nut and operatively engaged with the thread of said worm so that rotation of said worm will axially slide said nut in said housing, said bore being enlarged to form a cylindrical cavity radially outwardly of said worm and to provide a radial contact wall, a seal assembly operatively mounted in said cavity for restricting the fluid passage between said chambers through said helical thread of said worm, said seal assembly comprising a resilient seal body terminating in radially outwardly extending flange means, said seal body having internal thread means engaging the helical thread of said worm to permit said seal body to threadedly move axially with respect to said worm, a backup member carried by said nut for trapping said seal body for limited axial movement in said said cavity and cooperating with said flange means and said contact wall for forming an auxiliary pressure chamber between said nut and said seal body radially outwardly of said seal assembly so that when one of said primary chambers is pressurized said body threads along said worm and said flange means effects axial fluid sealing with said backup member and said cylindrical body is constricted radially inwardly against said worm to effect radial fluid sealing between said worm and said nut.

3. A vehicle power steering gear comprising a housing, a piston nut slidably mounted in said housing and separating said housing into a pair of primary fluid pressure chambers, said nut having an axially extending bore formed therein, a cylindrical worm extending through said bore of said nut, said worm having a helical thread, thread engaging means carried by said nut and operatively engaged with the thread of said worm so that rotation of said worm will axially move said nut in said housing, said bore being enlarged to form a cavity radially outwardly of said worm and to provide a radial wall, a seal assembly operatively for restricting the fluid passage between said primary chambers through said helical thread of said worm, said seal assembly comprising a resilient cylindrical body terminating in radially extending flange means and mounted for threaded axial movement on said worm, said cylindrical body having internal thread means for engaging the helical thread of said worm, said radial wall providing contact means selectively sealingly engaged with said flange means, a backup member carried by said nut for trapping said body in said bore and spaced from said radial contact means by a distance sufficient to permit said threaded movement of said cylindrical body on said worm between said contact means and said radial wall, said cylindrical body and said flange means cooperating with said backup member and said radial wall for forming an auxiliary pressure chamber between said nut and said cylindrical body radially outwardly of said seal assembly so that when one of said primary fluid pressure chambers is pressurized said seal assembly is moved in a longitudinal direction and said flange means effects axial fluid sealing with said radial wall and said cylindrical body is constricted radially inwardly against said worm to effect radial fluid sealing with said worm to thereby restrict fluid communication between said primary fluid pressure chambers through the thread of said worm.

* * * * *